United States Patent
Spears

(12) 
(10) Patent No.: US 6,635,858 B2
(45) Date of Patent: Oct. 21, 2003

(54) IMAGING DEVICE WITH AN ILLUMINATION SOURCE HAVING AN INVERTED RADIATION PROFILE AND A METHOD OF IMAGING

(75) Inventor: Kurt E. Spears, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/938,002

(22) Filed: Aug. 22, 2001

(65) Prior Publication Data

US 2003/0038226 A1 Feb. 27, 2003

(51) Int. Cl.[7] .............................................. H01L 27/00
(52) U.S. Cl. ...................... 250/208.1; 250/585; 313/483
(58) Field of Search ............................. 250/208.1, 228, 250/227.28, 227.31, 234, 584, 585; 313/483, 484, 485, 487

(56) References Cited

U.S. PATENT DOCUMENTS 5,672,864 A * 9/1997 Kaplan .................. 250/227.28
6,239,884 B1 * 5/2001 Yamamoto .................. 358/475
6,296,976 B1 * 10/2001 Groves et al. ................. 430/30
6,452,326 B1 * 9/2002 Ge et al. ..................... 313/493

FOREIGN PATENT DOCUMENTS

GB    2376369 A   11/2002
JP    9050510 A   2/1997

* cited by examiner

*Primary Examiner*—Kevin Pyo
*Assistant Examiner*—Seung C. Sohn

(57) ABSTRACT

An imaging device comprising a linear illumination source having two ends and operable to radiate light onto a scan object, the illumination source radiating light along a length thereof, the light radiated from the illumination source having a minimum intensity at a midpoint thereof and a conversion element operable to convert light into electric charges corresponding to an image is provided. A method for imaging a scan object comprising radiating light from a linear illumination source having two endpoints onto the scan object, the light radiated from the illumination source having a maximum intensity at the two endpoints of the illumination source and a minimum intensity at a midpoint of the illumination source is provided.

20 Claims, 4 Drawing Sheets

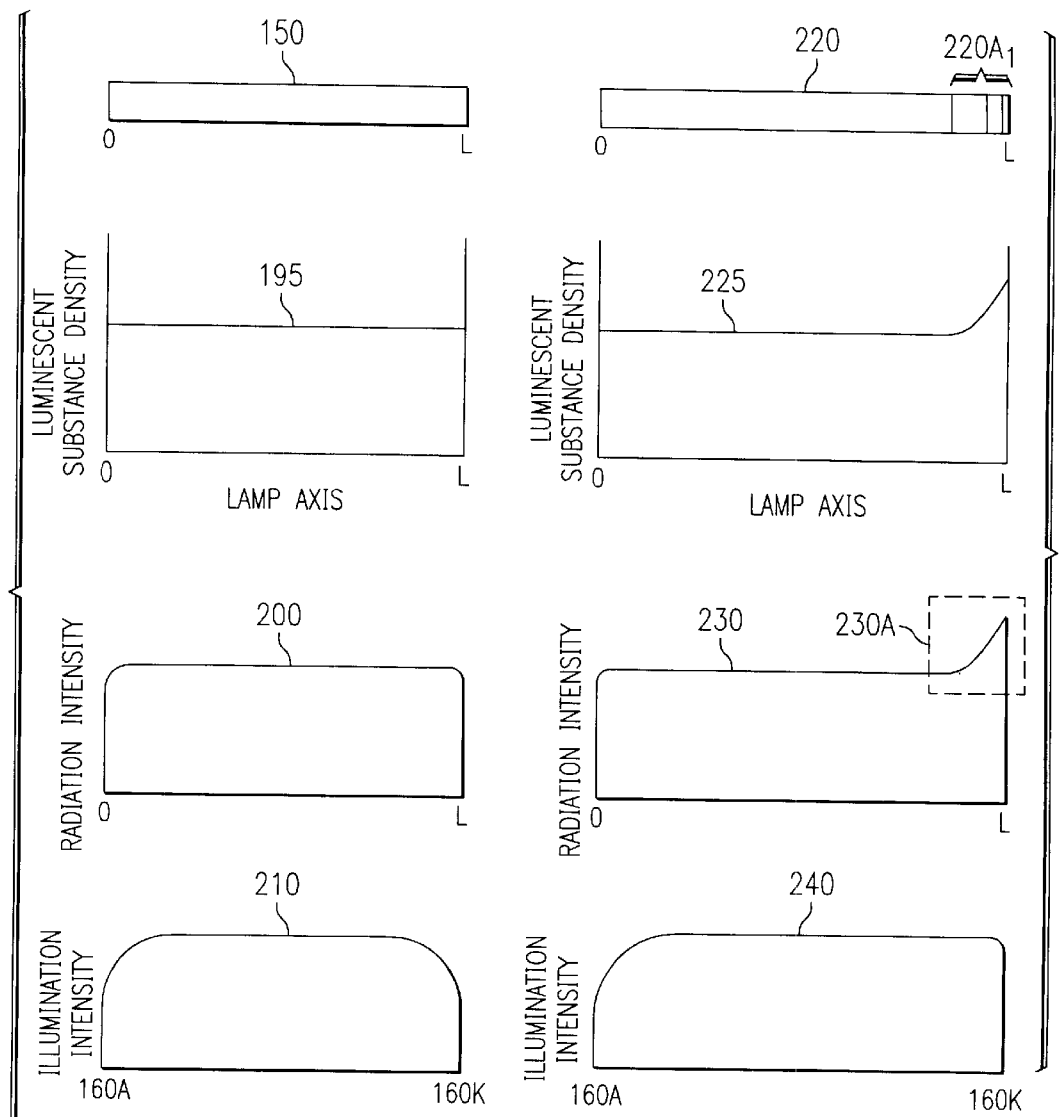
FIG. 5A (PRIOR ART)
FIG. 5B (PRIOR ART)
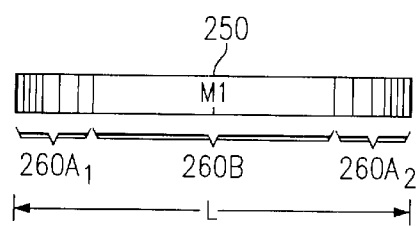
FIG. 6A
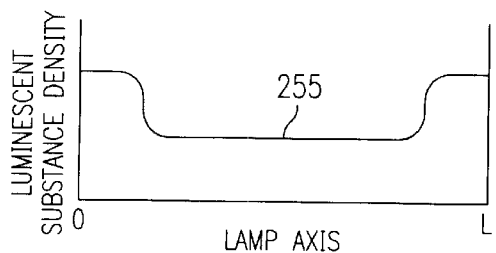
FIG. 6B

IMAGING DEVICE WITH AN ILLUMINATION SOURCE HAVING AN INVERTED RADIATION PROFILE AND A METHOD OF IMAGING

TECHNICAL FIELD OF THE INVENTION

This invention relates to imaging equipment and, more particularly, to a device and method for scanning using an illumination source with an inverted radiation profile.

BACKGROUND OF THE INVENTION

Optical scanners generate machine-readable image data representative of a scanned object such as an image on a paper document or other media having an image or other data thereon to be scanned. Flatbed optical scanners are stationary devices which have a transparent, platen upon which the object to be scanned is placed. Equipment such as flat bed scanners, film scanners, copiers, multi-function devices and some digital cameras may use a linear cold cathode fluorescent lamp (CCFL) as the light source. The object is scanned by sequentially imaging narrow strips or scan line portions of the object by an imaging apparatus such as a charge-coupled device (CCD). The imaging apparatus produces image data which is representative of each scan line portion of the scanned object. A linear arrangement of light sensitive elements, such as CCD photodetectors, is used to convert light into electric charges. There are many relatively low-priced color and black and white, one-dimensional array CCD photodetectors available for image scanning systems. Electronic imaging systems may alternatively use two-dimensional arrays of light sensitive elements such as CCD arrays.

While linear CCFLs are bright, inexpensive, and reliable, they also have one major disadvantage—they have a non-uniform illumination intensity profile that requires corrective analog or digital gain to normalize. Scanner systems employing these devices suffer from low signal-to-noise ratios at the ends of the scan lines due to decreased light intensity on the page and through the optical system.

SUMMARY OF THE INVENTION

In accordance with an embodiment of the present invention, an imaging device comprising a linear illumination source having two ends and operable to radiate light on a scan object, the illumination source radiating light along a length hereof, the light radiated from the illumination source having a minimum intensity at a midpoint thereof and at least one conversion element operable to convert light into electric charges corresponding to an image, is provided.

In accordance with another object of the present invention, a method for imaging a scan object comprising radiating light from a linear illumination source having two endpoints onto the scan object, the light radiated from the illumination source having a maximum intensity at the two endpoints of the illumination source and a minimum intensity at a midpoint of the illumination source is provided.

BRIEF DESCRIPTION OF THE DRAWINGS

For a more complete understanding of the present invention, the objects and advantages thereof, reference is now made to the following descriptions taken in connection with the accompanying drawings in which:

For a more complete understanding of the invention, the objects and advantages thereof, reference is now made to the following descriptions taken in connection with the accompanying drawings in which:

FIGS. 5A–5B, respectively, illustrate a radiation profile and a lighting profile of an illumination source having a uniform luminescent substance distribution and a radiation profile and a lighting profile of an illumination source having a typical luminescent substance distribution as is known in the prior art;

FIGS. 6A–6D illustrate an embodiment of an illumination source according to the present invention and exemplary luminescent substance density profiles resulting therefrom;

DETAILED DESCRIPTION OF THE DRAWINGS

The preferred embodiment of the present invention and its advantages are best understood by referring to FIGS. 1 through 8 of the drawings, like numerals being used for like and corresponding parts of the various drawings.

Figure 1:
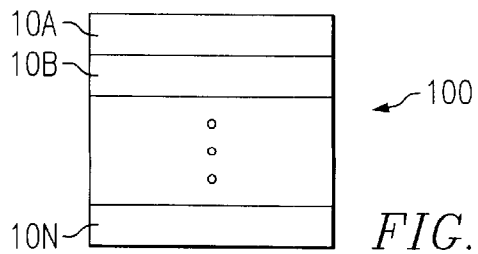
FIG. 1 is a diagram representing an embodiment of a scan media that may be scanned by an imaging system according to the present invention.

In FIG. 1, there is illustrated a scan media, such as for example and not by way of limitation, document 100 that may be scanned by an imaging system, for example a flatbed scanner, digital camera, copier, film scanner, or another device. The imaging system uses an illumination source, for example a linear cold cathode fluorescent lamp (CCFL) having phosphor, or another luminescent substance, excited by mercury molecules or another ultra-violet radiation source, to scan sequential scan line portions 10A–10N of document 100. Other types of lamps are commonly used in imaging devices, such as xenon lamps having phosphors excited by ultra-violet radiation from xenon molecules in the lamp tube. A scan line is illuminated with a CCFL with a plurality of focal points on each scan line. The totality of the light striking a particular focal point can be considered to originate from a finite number of point sources along the CCFL. The light that comes into focus on a focal point is generally passed through an image forming system, for example an image stabilizer, a filter, an optic system, a single lens, a holographic lens or another device. The light is then passed to a photodetector where it is converted to an electric charge. Generally, a plurality of electric charges are generated according to this technique for a given scan line. Once electric charges for a particular scan line have been produced, the charges for the next scan line are generated. This general procedure is repeated until all scan lines of document 100 have been imaged.

Figure 2:
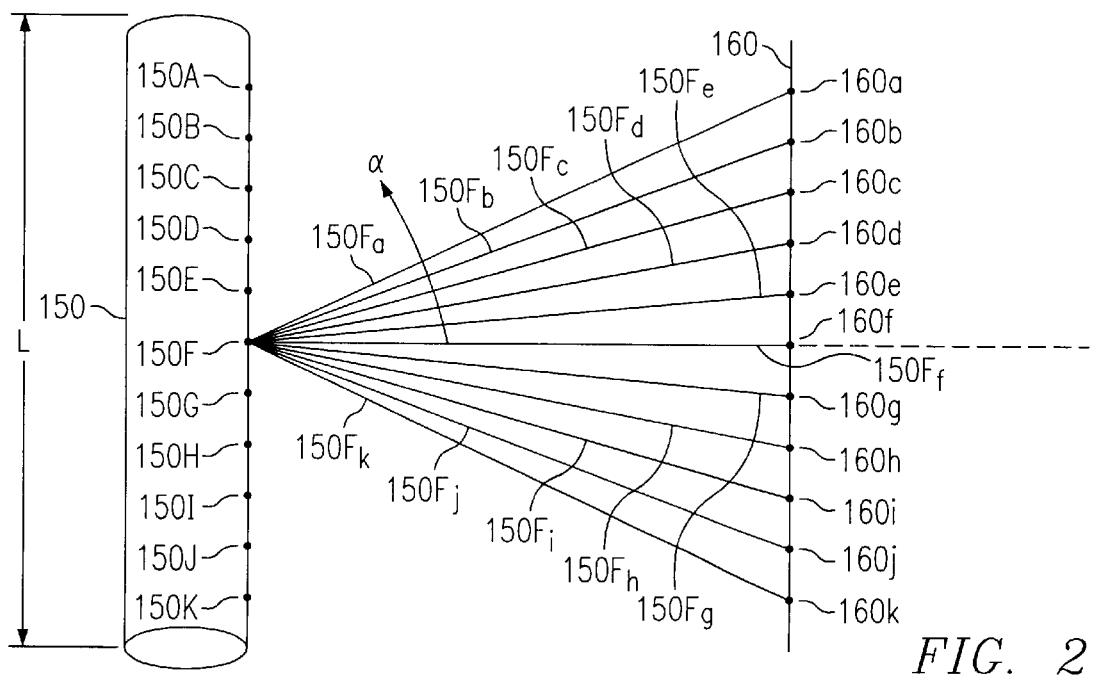
FIG. 2 is a diagram illustrating illumination of a scan object contributed from a single point of an illumination source.

In FIG. 2, there is illustrated an illumination source, for example a CCFL 150, radiating light onto a scan object 160.

Scan object 160 is representative of a scan line, for example scan line 10A, of scan document 100. In actuality, CCFL 150 radiates light along a continuous, cylindrical source having collinear endpoints (the terminating ends of CCFL 150). For simplification of discussion, the light radiating from CCFL 150 is considered to originate from a linear source comprised of a finite plurality of point sources 150A–150K colinearly located on CCFL 150.

Light rays are emitted from each point source 150A–150K of CCFL 150 in multi-directions, for example light rays $150F_a$-$150F_k$ are emitted from point source 150F. Each point source 150A–150K emits light rays that impinge along scan object 160. Each point source, for example point source 150F, radiates a plurality of light rays that impinge at various points 160a–160k along scan object 160. The intensity of illumination of any given point 160a–160k is a function of the distance between the point 160a–160k and the point source 150A–150K contributing to the illumination of the point 160a–160k. Specifically, the intensity of illumination provided by a given point source 150A–150K is proportional to $1/r^2$, where $r=d(\cos(\alpha))^{-1}$, d is the distance between the illuminated point 160a–160k and the illuminating point source, and $\alpha$ is an angle of impingement of the light rays originating from point sources 150A–150K with a particular point 160a–160k. Thus, the cumulative, or total, illumination intensity is an integral quantity inversely proportional to the square of r. Thus, point 160f will have a greater illumination intensity resulting from point source 150F than the illumination intensity of any other points 160a–160e and 160g–160k due to the direct, that is perpendicular, impingement of light ray $150F_f$ with point 160f. The illumination intensity for all other points 160a–160e and 160g–160k resulting from light radiated from point source 150F will decrease with an increase in the distance therebetween.

Figure 3:
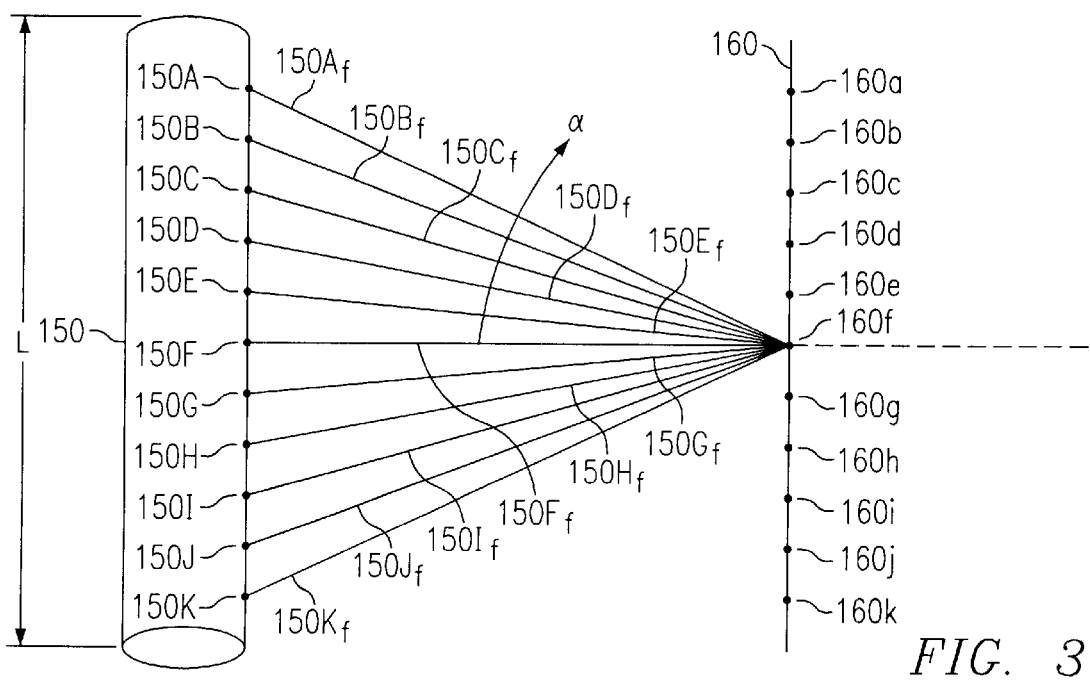
FIG. 3 is a diagram illustrating the cumulative illumination of a midpoint of a scan object resulting from the entirety of the illumination source.

The cumulative illumination of point 160f of scan object 160 can be considered to be an integral of the light radiating from along the entirety of point sources 150A–150K. As illustrated in FIG. 3, the total illumination intensity of point 160f of scan object 160 is an integral of the illumination contributions from various light rays $150A_f$-$150K_f$ originating from along the length of CCFL 150. The collection of light rays $150A_f$-$150K_f$ can be considered to include a principal light ray $150F_f$ impinging on point 160f perpendicularly therewith, that is principal light ray $150F_f$ impinges point 160f at an impingement angle $\alpha$ of zero, while remaining light rays $150A_f$-$150E_f$ and $150G_f$-$150K_f$ impinge point 160f at various angles of impingement $\alpha$ greater than zero. As mentioned above, a light ray's contribution to the illumination intensity of point 160f decreases with an increase in the distance between the illumination source and the illuminated point 160a–160k. Thus, light ray $150A_f$ provides less radiation to point 160f than, for example, light ray $150B_f$.

Figure 4:
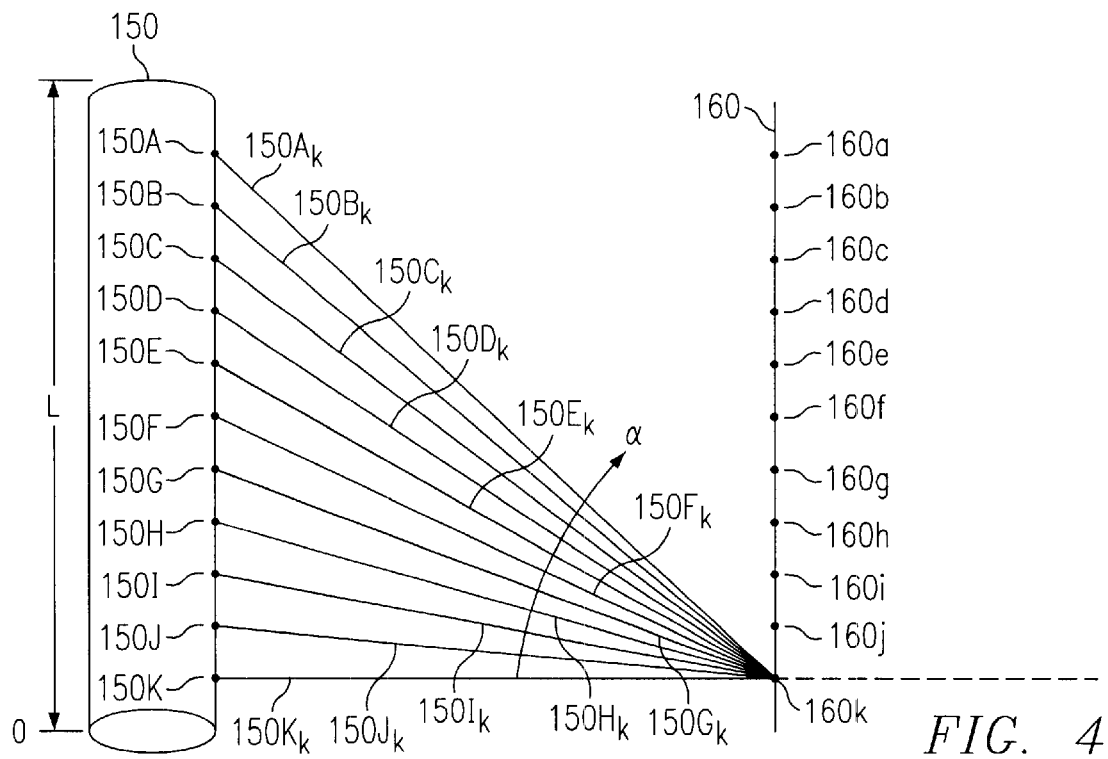
FIG. 4 is a diagram illustrating the cumulative illumination of an endpoint of a scan object resulting from the entirety of an illumination source.

If CCFL 150 were an idealized (that is radiating light rays along the length thereof with uniform intensity) and infinitely long light source, each point 160a–160f would be illuminated with identical intensity. However, because CCFL 150 is finite in length, a non-uniform illumination intensity profile is exhibited along scan object 160 that results in less intense illumination at points near the end of scan object 160. As illustrated in FIG. 4, the light radiating on point 160k at a far end of scan object 160 has a principle ray $150K_k$ having auxiliary rays $150A_k$-$150J_k$ originating from only one side of principle ray $150K_k$. Thus, the illumination intensity of point 160k will be less than the illumination intensity of, for example, point 160f because the illumination of point 160k is, in effect, an integral of point source illuminations over nearly 90 degrees while the illumination of point 160f is an integral of point source illuminations over nearly 180 degrees. The result is a non-uniform illumination intensity profile 210 as shown in FIG. 5A. Radiation profile 200 illustrates an approximate radiation profile along the length of the illumination source, for example CCFL 150, having a uniform distribution of a luminescent substance along the surface of CCFL 150. For example, a typical CCFL comprises a sealed glass tube with a luminescent substance, such as phosphor, distributed along the inner surface thereof. A CCFL having a surface with a uniform distribution of a luminescent substance will radiate light of uniform intensity along the length thereof, as illustrated by radiation profile 200. Notably, the radiation profile 200 is a non-integral measurement, that is each point of the radiation profile plot only indicates the intensity of radiation from points (O through L) along the length of CCFL 150 whereas the illumination intensity profile 210 shows the integral effect of illumination at points 160a–160k of an object being illuminated by an illumination source having radiation profile 200. Points along a midsection of scan object 160 have a greater illumination than points near either of the endpoints, for example points 160a and 160k, of scan object 160 due to the aforedescribed integral effect of illumination.

The non-uniform illumination intensity profile 210 of the CCFL 150 may also have a secondary cause resulting from a well documented function of the light gathering capability of a typical lens used in image capturing systems. The contributory effect to the non-uniform illumination intensity profile 210 due to the light gathering capabilities of a lens has been shown to be a $\cos^4$ function between the optical path centerline and a line drawn to the relevant area of the image. The overall effect causes an exponential loss of light as the angle increases at the endpoints of the scan object 100. Thus, imaging systems such as scanners that utilize CCFLs suffer from low signal-to-noise ratios at the ends of the scan lines due to decreased light on the scan object, or page, and through the remaining optical system.

The non-uniform illumination intensity profile 210 shown in FIG. 5A results from GCFL 150 having a uniform phosphor, or other illumination substance, coating along the length of CCFL 150, as indicated by a illumination substance density profile 195. However, the phosphor coating is often non-uniform along the length of a CCFL due to non-ideal properties of typical manufacturing techniques. For example, a common manufacturing technique results in a uniform distribution of a luminescent substance around the circumference of the illumination source but also results in a non-uniform distribution of the luminescent substance along the longitudinal axis of the illumination source. In FIG. 5B, there is illustrated a typical CCFL 220 having a non-uniform distribution of an illumination substance on an inner surface thereof as indicated by an illumination substance density profile 225. A section (illustratively denoted by shaded area $220A_1$) of CCFL 220 has a greater illumination substance density than the remaining portion of CCFL 220. Consequently, the end of CCFL 220 having the greater illumination substance density produces an increased light intensity radiated from that end as illustrated by a skewed region 230A of radiation profile 230. The skewed region 230A results in a counter-effect that offsets the typical loss of illumination near the ends of a scan object due to the described integral effect of illumination. A resulting illumination intensity profile 240 has a more linear plot at the corresponding end and results in a reduction, or elimination, of the required corrective normalization at that end. The present invention utilizes a lamp tube that advantageously exploits a variation of this phenomena. An imaging device of the present invention utilizes a lamp tube having a non-uniform illumination substance distribution that includes a luminescent substance density that is greater at both ends, rather than at a single end, of the tube than at a midsection of the tube—such an imaging device operable to provide an improved, uniform illumination intensity profile of a media or other object scanned thereby.

Figure 7:
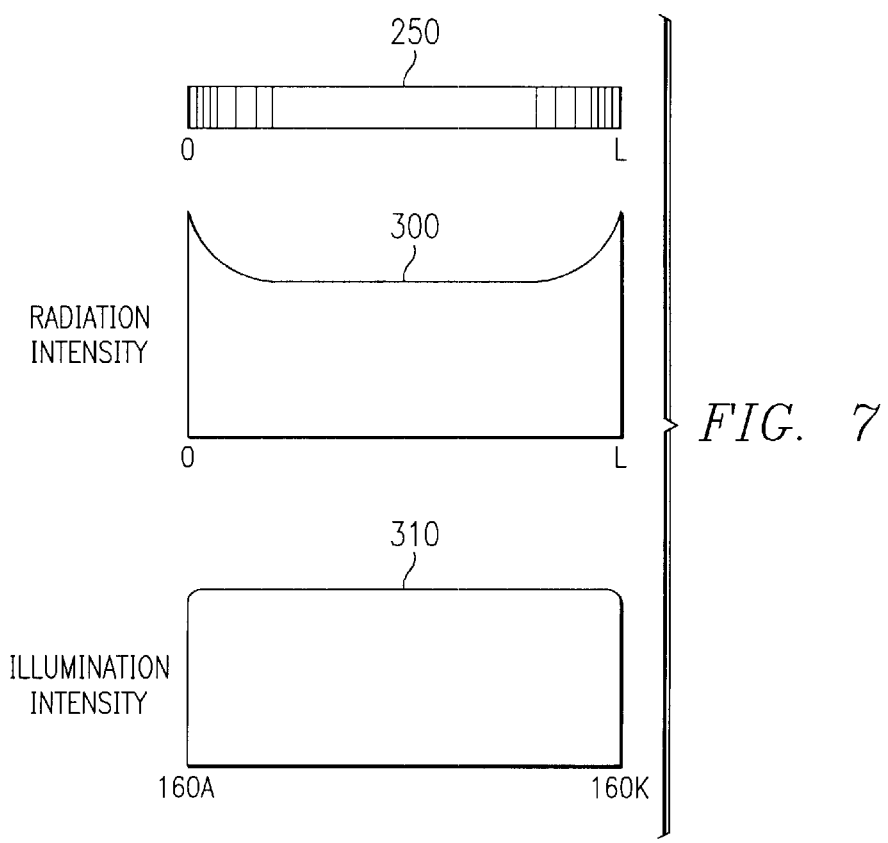
FIG. 7 is a diagram illustrating a radiation profile and lighting profile of an imaging system according to the an embodiment of the invention utilizing the illumination source described with reference to FIG. 6.
Figure 6C:
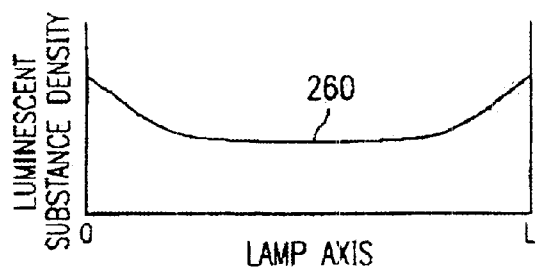
Figure 6D:
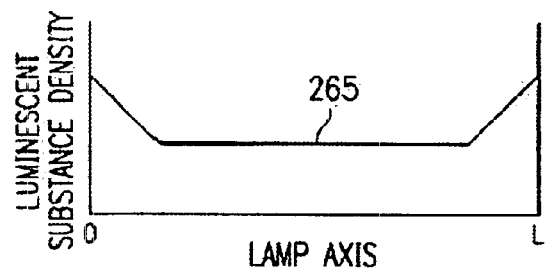

In FIG. 6A, there is illustrated a CCFL 250, or other illumination source, with a novel phosphor, or other luminescent substance, density distribution along the length thereof constructed according to the teachings of the present invention. A midsection 260B of CCFL 250 has a generally constant phosphor density distribution as illustrated by luminescent substance density profile 255 (FIG. 6B). The ends $260A_1$ and $260A_2$ of CCFL 250 have a higher phosphor density distribution compared to midsection 260B. While the illustration shows CCFL 250 having areas of two different phosphor densities, it should be understood that ends $260A_1$ and $260A_2$ may have a non-constant phosphor density as well. For example, ends $260A_1$ and $260A_2$ may have a phosphor density distribution that increases toward the ends of CCFL 250 as illustrated by luminescent substance density profile 260 (FIG. 6C). In fact, midsection 260B may also have a slightly increasing phosphor density distribution from its midpoint (point M1) outward towards sections $260A_1$ and $260A_2$ as illustrated by the luminescent substance density profile 265 (FIG. 6D). Thus, CCFL 250 is characterized most generally as having an increasing phosphor density distribution outwardly from a midpoint M1 of CCFL 250 and has a corresponding minimum radiation intensity at the midpoint M1 of CCFL 250. The minimum radiation intensity may be commonly radiated from a portion of CCFL 250 including midpoint M1 and spanning outwardly therefrom towards either (or both) endpoint (O or L) to a point where the radiation intensity increases. The luminescent substance density distribution preferably provides a uniform illumination intensity profile 310, as illustrated in FIG. 7, that results from a non-uniform radiation profile 300. As shown, illumination intensity profile 310 is of approximately equivalent intensity at all points spanning the length of the scan object.

According to the present invention, to achieve uniform illumination intensity profile 310, CCFL 250 preferably provides a non-uniform radiation intensity along the length of CCFL 250, that is the radiation profile 300 is preferably non-uniform to compensate for the integral effects of illumination and/or lens losses as discussed hereinabove. As described with reference to FIG. 6, a non-linear phosphor distribution is used for obtaining an illumination intensity greater near ends $260A_1$ and $260A_2$ than along the midsection of CCFL 250. Preferably, the phosphor distribution of CCFL 250 is implemented such that radiation profile 300 is the inverse of illumination intensity profile 210 illustrated in FIG. 5. Illumination with such a light source produces uniform illumination of a scan object by compensating illumination at the ends of a scan object by impinging principle rays thereon that are of greater intensity than principle rays radiated along the midsection of the illumination source.

Figure 8A:
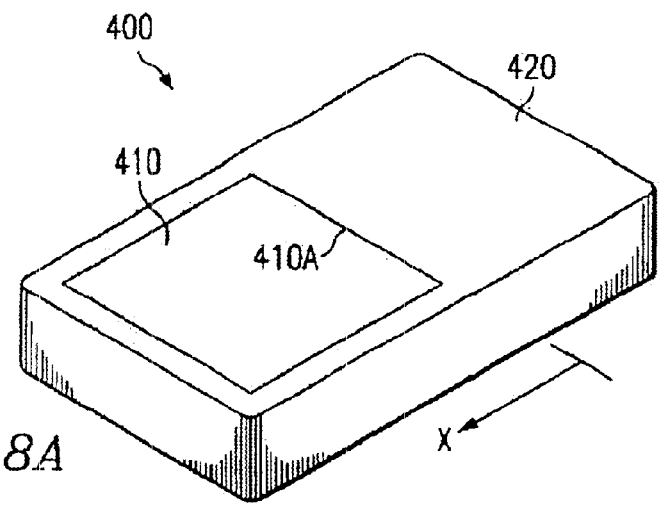
FIGS. 8A and 8B are perspective views of an embodiment of a document scanner system including a carriage supporting an illumination source having an inverted radiation profile according to an embodiment of the invention.
Figure 8B:
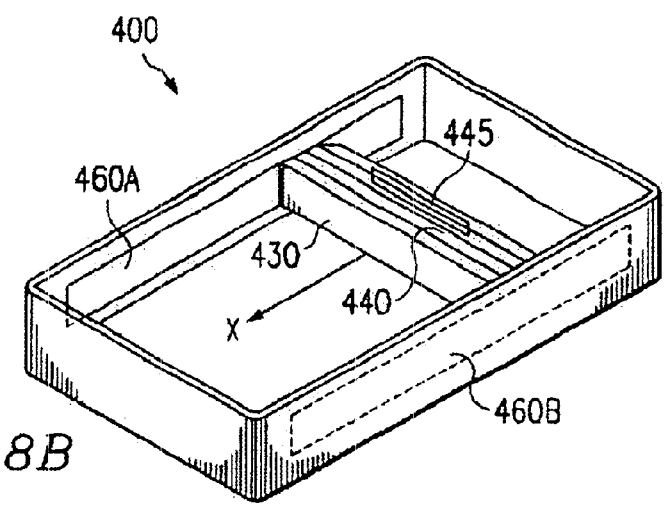

Referring to FIGS. 8A and 8B, there is respectively illustrated a perspective view of an embodiment of an imaging system 400 and a perspective view of imaging system 400 having a top surface 420 removed, according to the present invention. For illustrative purposes, and not by way of limitation, imaging system 400 is illustrated as a reflective document scanner 400 with a transparent platen 410 on which a document, or other media, to be scanned is placed. Reflective scanner 400 may be connected to a computer for facilitating control of the scanner.

A lamp 440 located within scanner 400 radiates light that passes through platen 410 and is reflected off a media placed on platen 410. The reflected light is collected by an internal optic system (not shown) and directed onto a photosensitive device 445 where the reflected light is converted into one or more electric signals. A carriage 430 in scanner 400 may support one or more scanner devices or subsystems, such as lamp 440, an optic system and a photosensitive device 445 or array. Carriage 430 may have a home position (X=0) from which scan operations are initiated. The carriage home position will generally correspond to a leading edge 410A of platen 410. As light is radiated from lamp 440, carriage 430 is driven through a translation distance (X), or carriage path, along one or more support rails 460A and 460B by a carriage drive system such as a carriage belt drive assembly. One or more photosensitive devices 445 converts light reflected from the lamp as the carriage moves through the carriage path.

The imaging system 400 of the present invention employs a lamp 440 having a non-linear distribution of a luminescent substance on a surface thereof as described hereinabove with reference to FIGS. 6 and 7. Accordingly, when scanning an object placed on platen 410, the illumination of the scan object has a uniform illumination intensity profile 310. Thus, scanner 400 may eliminate, or reduce, the need for corrective analog or digital gain to normalize the scanned image.

What is claimed is:

1. An imaging device, comprising:
   a linear illumination source having two ends and operable to radiate light on a scan object, the illumination source radiating light along a length thereof, the light radiated from the illumination source having a minimum intensity at a midpoint thereof; and
   at least one conversion element operable to convert light into electric charges corresponding to an image.

2. The imaging device according to claim 1, wherein the light radiated from the illumination source has a maximum intensity at the ends of the illumination source.

3. The imaging device according to claim 1, wherein the illumination source is a cold cathode fluorescent lamp.

4. The imaging device according to claim 1, wherein the illumination source has a luminescent substance distributed on an inner surface thereof.

5. The imaging device according to claim 4, wherein the luminescent substance is phosphor.

6. The imaging device according to claim 4, wherein the luminescent substance has a distribution along the inner surface of the illumination source having a minimum density at the midpoint of the illumination source.

7. The imaging device according to claim 6, wherein the luminescent substance has a distribution along the inner surface of the illumination source having a maximum density at the endpoints of the illumination source.

8. The imaging device according to claim 7, wherein the at least one conversion element is a linear array of charge coupled-devices.

9. The imaging device according to claim 1, wherein the device is one of a flatbed scanner, film scanner, copier, multi-function device and digital camera.

10. A method for imaging a scan object, comprising radiating light from a linear illumination source having two endpoints onto the scan object, the light radiated from the illumination source having a maximum intensity at the two endpoints and a minimum intensity at a midpoint of the illumination source.

11. The method according to claim 10, wherein the minimum intensity outwardly extends from the midpoint towards both endpoints along a respective length of the illumination source, the length being less than an entire length of the illumination source.

12. The method according to claim 10, wherein radiating light from an illumination source further comprises radiating light from a cold cathode fluorescent lamp.

13. The method according to claim 10, wherein radiating light from an illumination source further comprises having a luminescent substance distributed along the length of said illumination source, the distribution having a maximum density at the endpoints and a minimum density at the midpoint of said illumination source.

14. The method according to claim 13, wherein the luminescent substance is phosphor.

15. The method according to claim 10, wherein radiating light from an illumination source further comprises radiating light from a xenon lamp.

16. The method according to claim 15, wherein radiating light from the xenon lamp further comprises radiating light from the xenon lamp having phosphors excited by ultraviolet radiation.

17. An imaging device, comprising an illumination source having two ends and operable to radiate light on a scan object, the illumination source having a luminescent substance distributed along a length of the illumination source, a density of the luminescent substance greater at the ends of the illumination source than at a midpoint of the illumination source.

18. The imaging device according to claim 17, wherein the luminescent substance has a density that increases from the midpoint toward both ends.

19. The imaging device according to claim 17, wherein the illumination source further comprises a midsection including the midpoint located between the two ends, the luminescent substance having a constant density in the midsection.

20. The imaging device according to claim 17, wherein the illumination source is a linear cold cathode fluorescent lamp.

* * * * *